(12) United States Patent
Kramer et al.

(10) Patent No.: US 8,585,919 B2
(45) Date of Patent: *Nov. 19, 2013

(54) REFRIGERATION OIL FROM GAS-TO-LIQUID DERIVED AND BIO-DERIVED DIESTERS

(75) Inventors: David C. Kramer, San Anselmo, CA (US); Ravindra Shah, Concord, CA (US); Stephen J. Miller, San Francisco, CA (US); Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,523

(22) Filed: Jul. 19, 2012

(65) Prior Publication Data
US 2013/0043424 A1    Feb. 21, 2013

Related U.S. Application Data

(60) Continuation-in-part of application No. 12/336,644, filed on Dec. 17, 2008, now Pat. No. 8,190,756, and a division of application No. 13/212,964, filed on Aug. 18, 2011, now Pat. No. 8,268,197.

(60) Provisional application No. 61/016,021, filed on Dec. 21, 2007.

(51) Int. Cl.
*C09K 5/04* (2006.01)

(52) U.S. Cl.
USPC .......................................................... 252/68

(58) Field of Classification Search
USPC .......................................................... 252/68
See application file for complete search history.

(56) References Cited

U.S. PATENT DOCUMENTS

| | | | |
|---|---|---|---|
| 7,544,645 B2 * | 6/2009 | Miller et al. | 508/485 |
| 8,268,187 B2 * | 9/2012 | Krammer et al. | 252/68 |
| 2006/0019840 A1 * | 1/2006 | Kawahara et al. | 508/280 |

* cited by examiner

*Primary Examiner* — John Hardee
(74) *Attorney, Agent, or Firm* — Jeffrey M. McQuiston; Penny L. Prater

(57) ABSTRACT

The present invention is directed to a refrigerator oil composition comprising
(a) at least one diester species having the following structure:

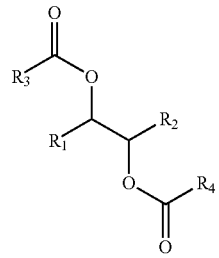

wherein $R_1$, $R_2$, $R_3$, and $R_4$ are the same or independently selected from hydrocarbon groups having from 2 to 17 carbon atoms; and
(b) a refrigerant.

10 Claims, 9 Drawing Sheets

Hexanoic acid 1-ethyl-2-hexanoyloxy-butyl ester (3)

Octadecanoic acid 1-ethyl-2-octadecanoyloxy-butyl ester (4)

Table 1

| Compound | VI | VIS cSt (40 °C) | VIS cSt (100 °C) | Pour point | Cloud Point |
|---|---|---|---|---|---|
|  Hexanoic acid 2-hexanoyloxy-1-hexyl-octyl ester (1) | 68 | 9.32 | 2.42 | <-60 | -50 |
|  Decanoic acid 2-decanoyloxy-1-hexyl-octyl ester (2) | 117 | 17.5 | 3.9 | -39 | 7 |
|  50/50 wt% mixture 50/50 mix of (1) and (2) | 101 | 12.8 | 3.1 | <-60 | -50 |

Table 2

Examples of Commercial Refrigeration Oils and Their Properties

| Composition | VI | VIS cSt (40 °C) | VIS cSt (100 °C) | Pour Point (°C) | Cloud Point (°C) |
|---|---|---|---|---|---|
| Capella HFC 32 | 130 | 30.5 | 5.7 | -48 max | -- |
| Synative ES 3157 | 140 | ~46 | ~8 | -40 max | -20 |
| Capella HFC Auto | -- | 130 | 13.4 | -32 | -- |
| Polyoly Ester | 140 | 19.5 | 4.4 | -51 | -39 |

VIS: Viscosity

FIG. 6

REFRIGERATION OIL FROM GAS-TO-LIQUID DERIVED AND BIO-DERIVED DIESTERS

CROSS REFERENCE TO RELATED APPLICATIONS

This application is a divisional application of copending application Ser. No. 13/212,964, filed Aug. 18, 2011, now issued as U.S. Pat. No. 8,268,187, which is a continuation-in-part of Ser. No. 12/336,644, now abandoned, filed Dec. 17, 2008 and claims priority therefrom.

FIELD OF THE INVENTION

The present invention is directed to compositions suitable for use in refrigeration and air conditioning apparatus comprising at least one refrigerant, hydrofluorocarbon (i.e., HFC R-134A and R-410A), or mixtures thereof.

BACKGROUND OF THE INVENTION

Generally, naphthenic mineral oils, paraffinic mineral oils, alkylbenzenes, polyglycolic oils, ester oils and mixtures thereof, which have each a kinematic viscosity of 10-200 cSt at 40.degree. C., as well as these oils incorporated with suitable additives have been used as refrigerator oils.

On the other hand, chlorofluorocarbons (CFCS) type refrigerants, such as CFC-11, CFC-12, CFC-113 and HCFC-22, have been used for refrigerators.

Of these CFCS, CFCS such as CFC-11, CFC-12 and CFC-113, which are obtained by substituting all the hydrogen atoms of hydrocarbons thereof by halogen atoms including chlorine atoms, may lead to the destruction of the ozone layer, and therefore, the use of the CFCS has been controlled. Accordingly, halohydrocarbons, such as HFC-134a and HFC-152a, have been used as substitutes for CFCs. HFC-134a is especially promising as a substitute refrigerant since it is similar in thermodynamic properties to CFC-12 which has heretofore been used in many kinds of refrigerators of home cold-storage chests, air-conditioners and the like.

A number of patents have discussed esters that are useful as refrigerator oils.

Sasaki et al., U.S. Pat. No. 6,582,621 disclose a refrigerator oil for us in compressors using there in a hydrogen-containing halogenocarbon as a refrigerant, consisting essentially of as a base oil at least one kind of ester selected from the group consisting of a specific pentaerythritol ester such as an ester of pentaerythritol with a mono- or dicarboxylic acid, a specific polyol ester such as an ester of trimethylolethane with a mono- or dicarboxylic, a specific ester such as an ester of ethylene glycol and a dicarboxylic acid, and a specific polyol ester synthesized from a neopentyl type polyhydric alcohol, a monocarboxylic acid and a dicarboxylic acid; and further comprising at least one kind of an epoxy compound.

Ankner et al., U.S. Patent Publication No. US 2004/0046146 disclose refrigerant compositions which comprise a hydrofluorocarbon based refrigerant, and mixed with the refrigerant, a polyol ester based lubricant. The polyol ester comprises a diol having a strong sterically hindered hydrogen attached to the carbon in position 2, said diol being esterified with a mixture of mono- and diabasic carboxylic acids.

Schnur, U.S. Pat. No. 6,551,523 discloses an ester blend, including an ester having neopentylglycol and a source of 2-ethylhexanoic acid as its reactive components and an ester having pentaerythritol and a source of 2-ethylhexanoic acid as its reactive components, is especially effective as a lubricant for chlorine-free fluorocarbon refrigerant heat transfer fluids, particularly Refrigerant 134a (1,1,1,2-tetrafluoroethane).

Shimomura et al., U.S. Pat. No. 7,045,490 disclose a refrigerating machine oil composition that comprises an alicyclic polycarboxylic acid ester compound obtained from the following compounds (a) to (c): (a) an alicyclic polycarboxylic acid having an alicyclic ring and two or more carboxyl groups are bonded to mutually adjacent carbon atoms on the alicyclic ring; (b) a compound with two or more hydroxyl groups or its derivative; and (c) a compound with one hydroxyl group or its derivative.

Glova U.S. Pat. No. 4,556,496 discloses a refrigeration lubricating oil composition comprising a branched-chain alkylbenzene or mixture of branched-chain alkylbenzenes containing a total of from 10 to 25 carbon atoms in the alkyl groups, and about 50 ppm to 5 weight percent of a dialkyl sulfosuccinate wherein each alkyl group has 3 to 7 carbon atoms.

Shimomura et al., U.S. Pat. No. 6,831,045 disclose a refrigerating machine oil composition comprising an alicyclic dicarboxylic acid ester compound containing an alicyclic ring and two ester groups represented by the following general formula: —COOR$^1$ where R$^1$ represents a hydrocarbon group of 1-30 carbons, where R$^1$ represents a hydrocarbon group of 1-30 carbons, the two ester groups bonded to mutually adjacent carbon atoms on the alicyclic ring, wherein the molar ratio of cis-forms and trans-forms for the orientation of the two ester groups of the alicyclic dicarboxylic acid ester compound is from 20/80 to 80/20.

Kawahara, US. Publication 2006/0019840A1 is directed to a lubricating oil for bearings. It is not a refrigerator oil composition such as those disclosed in this invention.

Kawahara is directed to adipate and azelate diesters made from terminal diols, not the vicinal diesters of the current invention.

SUMMARY OF THE INVENTION

The present invention is directed to a refrigerator oil composition comprising gas-to-liquid derived and bio-derived esters.

In one embodiment, the present invention is directed to a refrigerator oil composition comprising
(a) at least one diester species having the following structure:

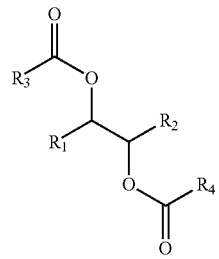

wherein $R_1$, $R_2$, $R_3$, and $R_4$ are the same or independently selected from $C_2$ to $C_{17}$ hydrocarbon groups; and
(b) a refrigerant.

BRIEF DESCRIPTION OF THE FIGURES

FIG. 6 (Table 2) depicts Examples of Commercial Refrigeration Oils and their properties.

DETAILED DESCRIPTION OF THE INVENTION

Definitions

Figure 1:
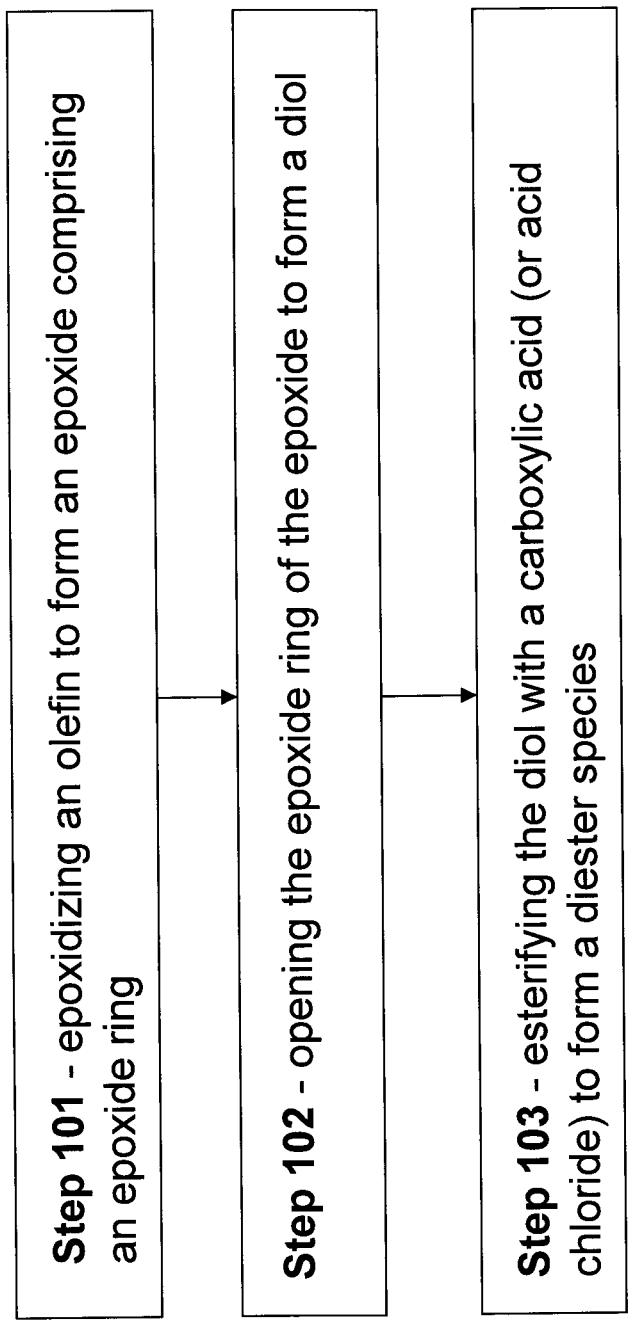
FIG. 1 is a flow diagram illustrating a method of making diester-based lubricant compositions, in accordance with some embodiments of the present invention.

As used herein, the following terms have the following meanings unless expressly stated to the contrary:

"Lubricants," as defined herein, are substances (usually a fluid under operating conditions) introduced between two moving surfaces so to reduce the friction and wear between them. Base oils used as motor oils are generally classified by the American Petroleum Institute as being mineral oils (Group I, II, and III) or synthetic oils (Group IV and V). See American Petroleum Institute (API) Publication Number 1509.

"Pour point," as defined herein, represents the lowest temperature at which a fluid will pour or flow. See, e.g., ASTM International Standard Test Methods D 5950-96, D 6892-03, and D 97.

"Cloud point," as defined herein, represents the temperature at which a fluid begins to phase separate due to crystal formation. See, e.g., ASTM Standard Test Methods D 5773-95, D 2500, D 5551, and D 5771.

"Centistoke," abbreviated "cSt," is a unit for kinematic viscosity of a fluid (e.g., a lubricant), wherein 1 centistoke equals 1 millimeter squared per second (1 cSt=1 mm²/s). See, e.g., ASTM Standard Guide and Test Methods D 2270-04, D 445-06, D 6074, and D 2983.

With respect to describing molecules and/or molecular fragments herein, "$R_n$," where "n" is an index, refers to a hydrocarbon group, wherein the molecules and/or molecular fragments can be linear and/or branched. As defined herein, "$C_n$," where "n" is an integer, describes a hydrocarbon molecule or fragment (e.g., an alkyl group) wherein "n" denotes the number of carbon atoms in the fragment or molecule.

The prefix "bio," as used herein, refers to an association with a renewable resource of biological origin, such as resource generally being exclusive of fossil fuels.

The term "internal olefin," as used herein, refers to an olefin (i.e., an alkene) having a non-terminal carbon-carbon double bond (C=C). This is in contrast to "α-olefins" which do bear a terminal carbon-carbon double bond.

One embodiment of the invention is directed to a refrigerating oil composition comprising (a) a diester-based lubricant derived from a biomass precursor and/or low value Fischer-Tropsch (FT) olefins and/or alcohols and (b) a refrigerant. In some embodiments, such diester-based lubricants are derived from FT olefins and fatty (carboxylic) acids. In these or other embodiments, the fatty acids can be from a bio-based source (i.e., biomass, renewable source) or can be derived from FT alcohols via oxidation.

A. Diester Lubricant Compositions

In some embodiments, the present invention is generally directed to diester-based lubricant compositions comprising a quantity of diester species having the following chemical structure:

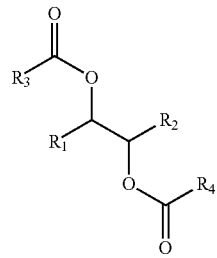

where $R_1$, $R_2$, $R_3$, and $R_4$ are the same or independently selected from a $C_2$ to $C_{17}$ carbon fragment.

Regarding the above-mentioned diester species, selection of $R_1$, $R_2$, $R_3$, and $R_4$ can follow any or all of several criteria. For example, in some embodiments, $R_1$, $R_2$, $R_3$, and $R_4$ are selected such that the kinematic viscosity of the composition at a temperature of 100° C. is typically 3 centistokes (cSt) or greater. In some or other embodiments, $R_1$, $R_2$, $R_3$, and $R_4$ are selected such that the pour point of the resulting lubricant is −20° C. or lower. In some embodiments, $R_1$ and $R_2$ are selected to have a combined carbon number (i.e., total number of carbon atoms) of from 6 to 14. In these or other embodiments, $R_3$ and $R_4$ are selected to have a combined carbon number of from 10 to 34. Depending on the embodiment, such resulting diester species can have a molecular mass between 340 atomic mass units (a.m.u.) and 780 a.m.u.

In some embodiments, such above-described compositions are substantially homogeneous in terms of their diester component. In some or other embodiments, the diester component of such compositions comprises a variety (i.e., a mixture) of diester species.

In some embodiments, the diester-based lubricant composition comprises at least one diester species derived from a $C_8$ to $C_{16}$ olefin and a $C_2$ to $C_{18}$ carboxylic acid. Typically, the diester species are made by reacting each —OH group (on the intermediate) with a different acid, but such diester species can also be made by reacting each —OH group with the same acid.

In some of the above-described embodiments, the diester-based lubricant composition comprises a diester species selected from the group consisting of decanoic acid 2-decanoyloxy-1-hexyl-octyl ester and its isomers, tetradecanoic acid-1-hexyl-2-tetradecanoyloxy-octyl esters and its isomers, dodecanoic acid 2-dodecanoyloxy-1-hexyl-octyl ester and its isomers, hexanoic acid 2-hexanoyloxy-1-hexy-octyl ester and its isomers, octanoic acid 2-octanoyloxy-1-hexyl-octyl ester and its isomers, hexanoic acid 2-hexanoyloxy-1-pentyl-heptyl ester and isomers, octanoic acid 2-octanoyloxy-1-pentyl-heptyl ester and isomers, decanoic acid 2-decanoyloxy-1-pentyl-heptyl ester and isomers, decanoic acid-2-cecanoyloxy-1-pentyl-heptyl ester and its isomers, dodecanoic acid-2-dodecanoyloxy-1-pentyl-heptyl ester and isomers, tetradecanoic acid 1-pentyl-2-tetradecanoyloxy-heptyl ester and isomers, tetradecanoic acid 1-butyl-2-tetradecanoyloxy-hexy ester and isomers, dodecanoic acid-1-butyl-2-dodecanoyloxy-hexyl ester and isomers, decanoic acid 1-butyl-2-decanoyloxy-hexyl ester and isomers, octanoic acid 1-butyl-2-octanoyloxy-hexyl ester and isomers, hexanoic acid 1-butyl-2-hexanoyloxy-hexyl ester and isomers, tetradecanoic acid 1-propyl-2-tetradecanoyloxy-pentyl ester and isomers, dodecanoic acid 2-dodecanoyloxy-1-propyl-pentyl ester and isomers, decanoic acid 2-decanoyloxy-1-propyl-pentyl ester and isomers, octanoic acid 1-2-octanoyloxy-1-propyl-pentyl ester and isomers, hexanoic acid 2-hexanoyloxy-1-propyl-pentyl ester and isomers, and mixtures thereof.

In some embodiments, the diester-based lubricant composition further comprises a base oil selected from the group consisting of Group I oils, Group II oils, Group III oils, and mixtures thereof.

The above-described esters may also be used as blending stocks. As such, esters with higher pour points may also be used as blending stocks with other lubricant oils, such as other refrigerator oils, since they are very soluble in hydrocarbons and hydrocarbon-based oils.

4. Methods of Making Diester Lubricants

As mentioned above, the present invention is additionally directed to methods of making the above-described lubricant compositions.

Referring to the flow diagram shown in FIG. 1, in some embodiments, processes for making the above-mentioned diester species, typically having lubricating base oil viscosity and pour point, comprise the following steps: (Step 101) epoxidizing an olefin (or quantity of olefins) having a carbon number of from 8 to 16 to form an epoxide comprising an epoxide ring; (Step 102) opening the epoxide ring to form a diol; and (Step 103) esterifying (i.e., subjecting to esterification) the diol with an esterifying species to form a diester species, wherein such esterifying species are selected from the group consisting of carboxylic acids, acyl acids, acyl halides, acyl anhydrides, and combinations thereof; wherein such esterifying species have a carbon number from 2 to 18; and wherein the diester species have a viscosity of 3 centistokes or more at a temperature of 100° C.

In some embodiments, where a quantity of such diester species is formed, the quantity of diester species can be substantially homogeneous, or it can be a mixture of two or more different such diester species.

In some such above-described method embodiments, the olefin used is a reaction product of a Fischer-Tropsch process. In these or other embodiments, the carboxylic acid can be derived from alcohols generated by a Fischer-Tropsch process and/or it can be a bio-derived fatty acid.

In some embodiments, the olefin is an α-olefin (i.e., an olefin having a double bond at a chain terminus). In such embodiments, it is usually necessary to isomerize the olefin so as to internalize the double bond. Such isomerization is typically carried out catalytically using a catalyst such as, but not limited to, crystalline aluminosilicate and like materials and aluminophosphates. See, e.g., U.S. Pat. Nos. 2,537,283; 3,211,801; 3,270,085; 3,327,014; 3,304,343; 3,448,164; 4,593,146; 3,723,564 and 6,281,404; the last of which claims a crystalline aluminophosphate-based catalyst with 1-dimensional pores of size between 3.8 Å and 5 Å.

Figure 2:
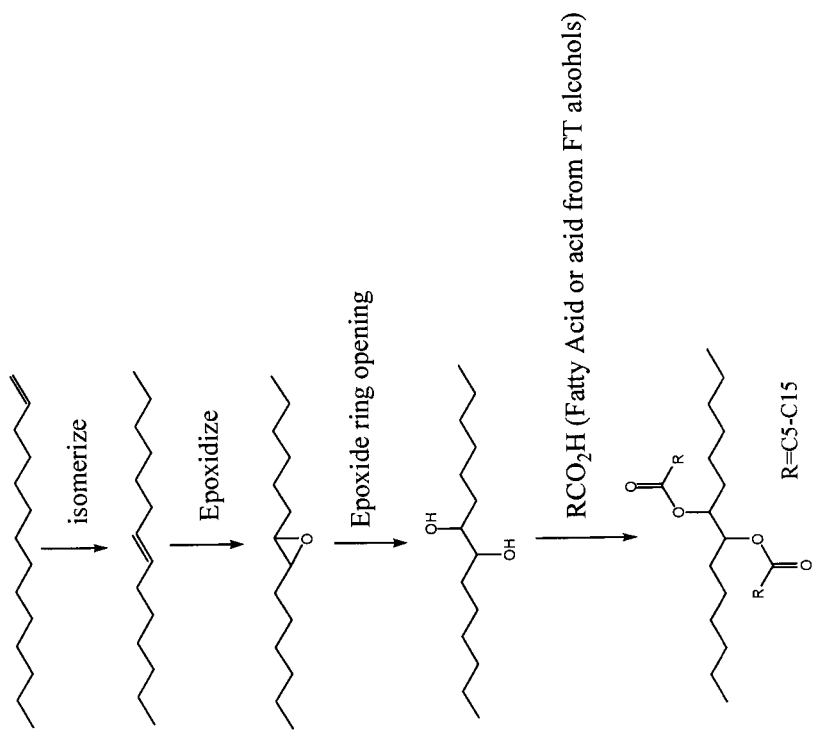
FIG. 2 (Scheme 1) is a chemical flow diagram illustrating an exemplary method of making a diester-based lubricant composition, in accordance with some embodiments of the present invention.

As an example of such above-described isomerizing and as indicated in Scheme 1 (FIG. 2), Fischer-Tropsch alpha olefins (α-olefins) can be isomerized to the corresponding internal olefins followed by epoxidation. The epoxides can then be transformed to the corresponding diols via epoxide ring opening followed by di-acylation (i.e., di-esterification) with the appropriate carboxylic acids or their acylating derivatives. It is typically necessary to convert alpha olefins to internal olefins because diesters of alpha olefins, especially short chain alpha olefins, tend to be solids or waxes. "Internalizing" alpha olefins followed by transformation to the diester functionalities introduces branching along the chain which reduces the pour point of the intended products. The ester groups with their polar character would further enhance the viscosity of the final product. Adding ester branches will increase the carbon number and hence viscosity. It can also decrease the associated pour and cloud points. It is typically preferable to have a few longer branches than many short branches, since increased branching tends to lower the viscosity index (VI).

Regarding the step of epoxidizing (i.e., the epoxidation step), in some embodiments, the above-described olefin (preferably an internal olefin) can be reacted with a peroxide (e.g., $H_2O_2$) or a peroxy acid (e.g., peroxyacetic acid) to generate an epoxide. See, e.g., D. Swern, in *Organic Peroxides Vol. II*, Wiley-Interscience, New York, 1971, pp. 355-533; and B. Plesnicar, in *Oxidation in Organic Chemistry, Part C*, W. Trahanovsky (ed.), Academic Press, New York 1978, pp. 221-253. Olefins can be efficiently transformed to the corresponding diols by highly selective reagent such as osmium tetra-oxide (M. Schroder, Chem. Rev. vol. 80, p. 187, 1980) and potassium permanganate (Sheldon and Kochi, in *Metal-Catalyzed Oxidation of Organic Compounds*, pp. 162-171 and 294-296, Academic Press, New York, 1981).

Regarding the step of epoxide ring opening to the corresponding diol, this step can be acid-catalyzed or based-catalyzed hydrolysis. Exemplary acid catalysts include, but are not limited to, mineral-based Brönsted acids (e.g., HCl, $H_2SO_4$, $H_3PO_4$, perhalogenates, etc.), Lewis acids (e.g., $TiCl_4$ and $AlCl_3$) solid acids such as acidic aluminas and silicas or their mixtures, and the like. See, e.g., Chem. Rev. vol. 59, p. 737, 1959; and Angew. Chem. Int. Ed., vol. 31, p. 1179, 1992. Based-catalyzed hydrolysis typically involves the use of bases such as aqueous solutions of sodium or potassium hydroxide.

Regarding the step of esterifying (esterification), an acid is typically used to catalyze the reaction between the —OH groups of the diol and the carboxylic acid(s). Suitable acids include, but are not limited to, sulfuric acid (Munch-Peterson, Org. Synth., V, p. 762, 1973), sulfonic acid (Allen and Sprangler, Org Synth., III, p. 203, 1955), hydrochloric acid (Eliel et al., Org Synth., IV, p. 169, 1963), and phosphoric acid (among others). In some embodiments, the carboxylic acid used in this step is first converted to an acyl chloride (via, e.g., thionyl chloride or $PCl_3$). Alternatively, an acyl chloride could be employed directly. Wherein an acyl chloride is used, an acid catalyst is not needed and a base such as pyridine, 4-dimethylaminopyridine (DMAP) or triethylamine (TEA) is typically added to react with an HCl produced. When pyridine or DMAP is used, it is believed that these amines also act as a catalyst by forming a more reactive acylating intermediate. See, e.g., Fersh et al., J. Am. Chem. Soc., vol. 92, pp. 5432-5442, 1970; and Hofle et al., Angew. Chem. Int. Ed. Engl., vol. 17, p. 569, 1978.

Regardless of the source of the olefin, in some embodiments, the carboxylic acid used in the above-described method is derived from biomass. In some such embodiments, this involves the extraction of some oil (e.g., triglyceride)

component from the biomass and hydrolysis of the triglycerides of which the oil component is comprised so as to form free carboxylic acids.

Figure 3:
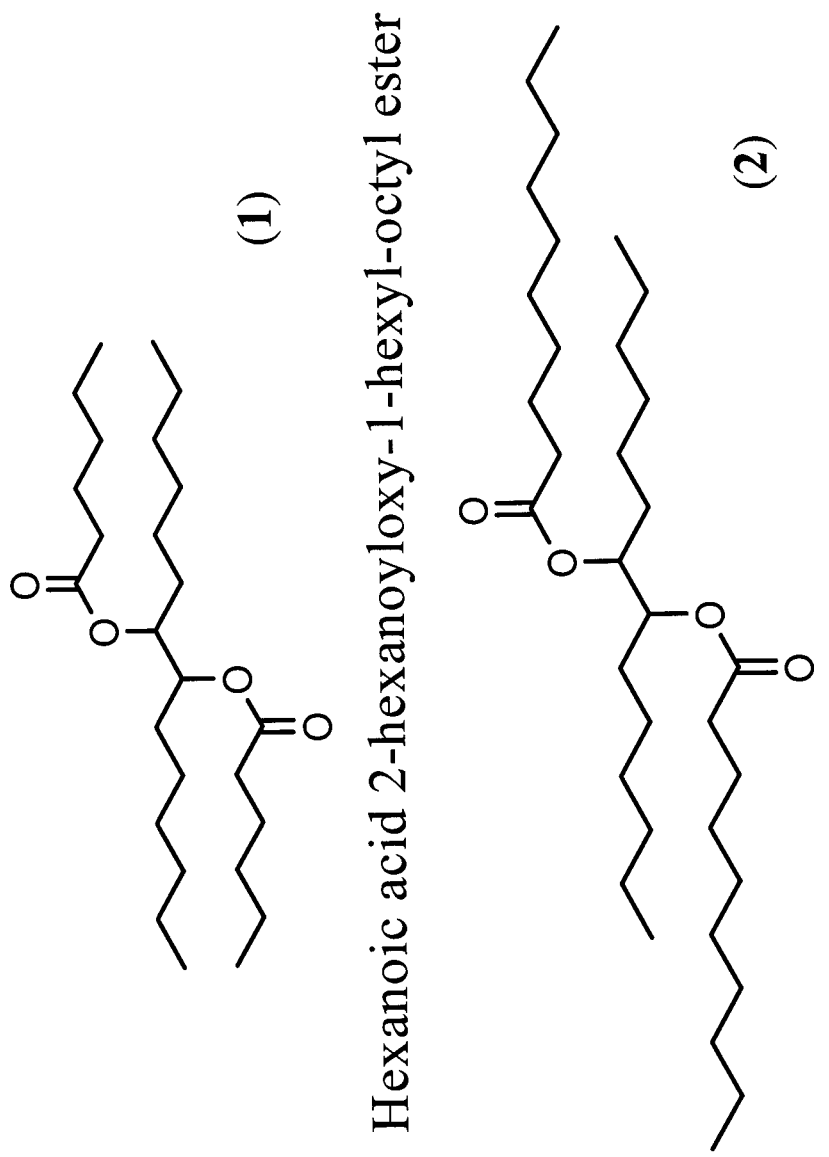
FIG. 3 depicts diester compounds 1 and 2 which were synthesized via a diol intermediate, in accordance with some embodiments of the present invention

Using a synthetic strategy in accordance with that outlined in Scheme 1 (FIG. 2), 7-tetradecene was converted to diester derivatives 1 and 2 via acylation of tetradecane-7,8-diol intermediate with hexanoyl and decanoyl chlorides, respectively, as shown in FIG. 3.

5. Variations

Variations (i.e., alternate embodiments) on the above-described lubricant compositions include, but are not limited to, utilizing mixtures of isomeric olefins and or mixtures of olefins having a different number of carbons. This leads to diester mixtures in the product compositions.

Variations on the above-described processes include, but are not limited to, using carboxylic acids derived from FT alcohols by oxidation.

The refrigerator oils of the present invention, which may comprise at least one of the FT derived or bio-mass derived di-esters as the base oil, should have a viscosity and pour point which is suitable for a refrigerator oil. Preferably, the pour point is not greater than −10° C. More preferred, the pour point is from about −20° C. to about −80° C. Most preferred, the pour point is from −25° C. to about −70° C. It is desirable to have a pour point greater than −10° C. in order to prevent the oils from solidifying at a low temperature. Further, the refrigerator oils preferably have a kinematic viscosity of not less than 2 cSt, and preferably not less than 3 cSt at 100° C. It is desirable to have a kinematic viscosity of not less than 2 cSt in order to keep the sealability of the compressor when used. Furthermore, the refrigerator oils should preferably have a kinematic viscosity of no more than 150 cSt. More preferred, the kinematic viscosity should be no more than 100 cSt at 100° C., in view of their fluidity at a low temperature and the efficiency of heat exchange in the evaporator when used.

6. Additional Oils

Optionally, the refrigerator oil may also comprise other esters, including but not limited to triesters. In one embodiment the refrigerator oil also comprises a triester species having the following chemical structure:

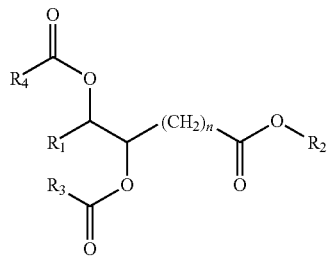

wherein $R_1$, $R_2$, $R_3$, and $R_4$ are the same or independently selected from hydrocarbon groups having from 2 to 20 carbon atoms and wherein "n" is an integer from 2 to 20.

Regarding the above-mentioned triester species, selection of $R_1$, $R_2$, $R_3$, $R_4$, and n can follow any or all of several criteria. For example, in some embodiments, $R_1$, $R_2$, $R_3$, $R_4$ and n are selected such that the kinematic viscosity of the composition at a temperature of 100° C. is typically 3 centistokes or greater. In some or other embodiments, $R_1$, $R_2$, $R_3$, $R_4$ and n are selected such that the pour point of the resulting lubricant is −20° C. or lower. In some embodiments, $R_1$ is selected to have a total carbon number of from 6 to 12. In these or other embodiments, $R_2$ is selected to have a carbon number of from 1 to 20. In these or other embodiments, $R_3$ and $R_4$ are selected to have a combined carbon number of from 4 to 36. In these or other embodiments, n is selected to be an integer from 5 to 10. Depending on the embodiment, such resulting triester species can typically have a molecular mass between 400 atomic mass units (a.m.u.) and 1100 a.m.u, and more typically between 450 a.m.u. and 1000 a.m.u.

In some embodiments, such above-described compositions are substantially homogeneous in terms of their triester component. In some or other embodiments, the triester component of such compositions comprises a variety (i.e., a mixture) of such triester species. In these or other embodiments, such above-described lubricant compositions further comprise one or more diester species.

In some of the above-described embodiments, the triester-based lubricant composition comprises one or more triester species of the type 9,10-bis-alkanoyloxy-octadecanoic acid alkyl ester and isomers and mixtures thereof, where the alkyl is selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, and octadecyl; and where the alkanoyloxy is selected from the group consisting of ethanoyloxy, propanoyoxy, butanoyloxy, pentanoyloxy, hexanoyloxy, heptanoyloxy, octanoyloxy, nonaoyloxy, decanoyloxy, undacanoyloxy, dodecanoyloxy, tridecanoyloxy, tetradecanoyloxy, pentadecanoyloxy, hexadeconoyloxy, and octadecanoyloxy. 9,10-bis-hexanoyloxy-octadecanoic acid hexyl ester and 9,10-bis-decanoyloxy-octadecanoic acid decyl ester are exemplary such triesters. In some embodiments, the triester-based lubricant composition further comprises a base oil selected from the group consisting of Group I oils, Group II oils, Group III oils, and mixtures thereof.

It is worth noting that in most applications, the above-described triesters and their compositions are may be used as blending stocks. As such, esters with higher pour points may also be used as blending stocks with other lubricant oils, such as refrigerator oils, since they are very soluble in hydrocarbons and hydrocarbon-based oils.

Methods of Making Triester Lubricants

Figure 1A:
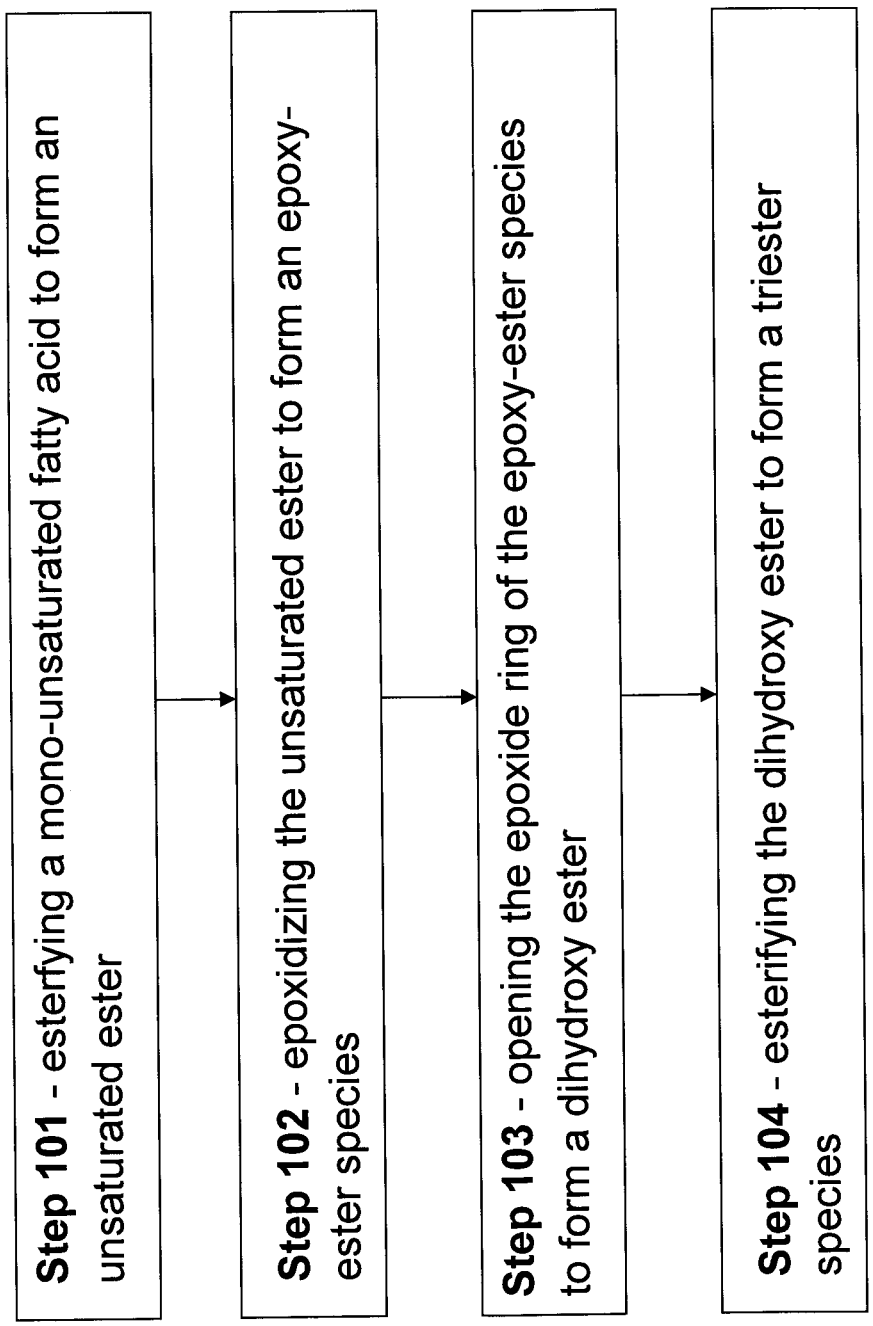
FIG. 1A is a flow diagram illustrating a method of making diester-based lubricant compositions, in accordance with some embodiments of the present invention.

Referring to the flow diagram shown in FIG. 1A, in some embodiments, processes for making the above-mentioned triester-based compositions, typically having lubricating base oil viscosity and pour point, comprise the following steps: (Step 101A) esterifying (i.e., subjecting to esterification) a mono-unsaturated fatty acid (or quantity of mono-unsaturated fatty acids) having a carbon number of from 16 to 22 with an alcohol to form an unsaturated ester (or a quantity thereof); (Step 102A) epoxidizing the unsaturated ester to form an epoxy-ester species comprising an epoxide ring; (Step 103A) opening the epoxide ring of the epoxy-ester species to form a dihydroxy-ester; and (Step 104A) esterifying the dihydroxy-ester with an esterifying species to form a triester species, wherein such esterifying species are selected from the group consisting of carboxylic acids, acyl halides, acyl anhydrides, and combinations thereof; and wherein such esterifying species have a carbon number of from 2 to 18. Generally, lubricant compositions made by such methods and comprising such triester species have a viscosity of 3 centistokes or more at a temperature of 100° C. and they typically have a pour point of less than −20° C., and selection of reagents and/or mixture components is typically made with this objective.

In some embodiments, where a quantity of such triester species is formed, the quantity of triester species can be substantially homogeneous, or it can be a mixture of two or more different such triester species. In any such embodiments, such triester compositions can be further mixed with one or more base oils of the type Group I-III. Additionally or alternatively, in some embodiments, such methods further comprise a step of blending the triester composition(s) with one or more diester species.

In some embodiments, such methods produce compositions comprising at least one triester species of the type 9,10-bis-alkanoyloxy-octadecanoic acid alkyl ester and isomers and mixtures thereof, where the alkyl is selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, and octadecyl; and where the alkanoyloxy is selected from the group consisting of ethanoyloxy, propanoyoxy, butanoyloxy, pentanoyloxy, hexanoyloxy, heptanoyloxy, octanoyloxy, nonaoyloxy, decanoyloxy, undacanoyloxy, dodecanoyloxy, tridecanoyloxy, tetradecanoyloxy, pentadecanoyloxy, hexadeconoyloxy, and octadecanoyloxy. Exemplary such triesters include, but not limited to, 9,10-bis-hexanoyloxy-octadecanoic acid hexyl ester; 9,10-bis-octanoyloxy-octadecanoic acid hexyl ester; 9,10-bis-decanoyloxy-octadecanoic acid hexyl ester; 9,10-bis-dodecanoyoxy-octadecanoic acid hexyl ester; 9,10-bis-hexanoyloxy-octadecanoic acid decyl ester; 9,10-bis-decanoyloxy-octadecanoic acid decyl ester; 9,10-bis-octanoyloxy-octadecanoic acid decyl ester; 9,10-bis-dodecanoyloxy-octadecanoic acid decyl ester; 9,10-bis-hexanoyloxy-octadecanoic acid octyl ester; 9,10-bis-octanoyloxy-octadecanoic acid octyl ester; 9,10-bis-decanoyloxy-octadecanoic acid octyl ester; 9,10-bis-dodecanoyloxy-octadecanoic acid octyl ester; 9,10-bis-hexanoyloxy-octadecanoic acid dodecyl ester; 9,10-bis-octanoyloxy-octadecanoic acid dodecyl ester; 9,10-bis-decanoyloxy-octadecanoic acid dodecyl ester; 9,10-bis-dodecanoyloxy-octadecanoic acid dodecyl ester; and mixtures thereof.

In some such above-described method embodiments, the mono-unsaturated fatty acid can be a bio-derived fatty acid. In some or other such above-described method embodiments, the alcohol(s) can be FT-produced alcohols.

In some such above-described method embodiments, the step of esterifying (i.e., esterification) the mono-unsaturated fatty acid can proceed via an acid-catalyzed reaction with an alcohol using, e.g., $H_2SO_4$ as a catalyst. In some or other embodiments, the esterifying can proceed through a conversion of the fatty acid(s) to an acyl halide (chloride, bromide, or iodide) or acyl anhydride, followed by reaction with an alcohol.

Regarding the step of epoxidizing (i.e., the epoxidation step), in some embodiments, the above-described mono-unsaturated ester can be reacted with a peroxide (e.g., $H_2O_2$) or a peroxy acid (e.g., peroxyacetic acid) to generate an epoxy-ester species. See, e.g., D. Swern, in *Organic Peroxides Vol. II*, Wiley-Interscience, New York, 1971, pp. 355-533; and B. Plesnicar, in *Oxidation in Organic Chemistry, Part C*, W. Trahanovsky (ed.), Academic Press, New York 1978, pp. 221-253. Additionally or alternatively, the olefinic portion of the mono-unsaturated ester can be efficiently transformed to the corresponding dihydroxy ester by highly selective reagents such as osmium tetra-oxide (M. Schroder, Chem. Rev. vol. 80, p. 187, 1980) and potassium permanganate (Sheldon and Kochi, in *Metal-Catalyzed Oxidation of Organic Compounds*, pp. 162-171 and 294-296, Academic Press, New York, 1981).

Regarding the step of epoxide ring opening to the corresponding dihydroxy-ester, this step is usually an acid-catalyzed hydrolysis. Exemplary acid catalysts include, but are not limited to, mineral-based Brönsted acids (e.g., HCl, $H_2SO_4$, $H_3PO_4$, perhalogenates, etc.), Lewis acids (e.g., $TiCl_4$ and $AlCl_3$), solid acids such as acidic aluminas and silicas or their mixtures, and the like. See, e.g., Chem. Rev. vol. 59, p. 737, 1959; and Angew. Chem. Int. Ed., vol. 31, p. 1179, 1992. The epoxide ring opening to the diol can also be accomplished by base-catalyzed hydrolysis using aqueous solutions of KOH or NaOH.

Regarding the step of esterifying the dihydroxy-ester to form a triester, an acid is typically used to catalyze the reaction between the —OH groups of the diol and the carboxylic acid(s). Suitable acids include, but are not limited to, sulfuric acid (Munch-Peterson, Org. Synth., V, p. 762, 1973), sulfonic acid (Allen and Sprangler, Org Synth., III, p. 203, 1955), hydrochloric acid (Eliel et al., Org Synth., IV, p. 169, 1963), and phosphoric acid (among others). In some embodiments, the carboxylic acid used in this step is first converted to an acyl chloride (or another acyl halide) via, e.g., thionyl chloride or $PCl_3$. Alternatively, an acyl chloride (or other acyl halide) could be employed directly. Where an acyl chloride is used, an acid catalyst is not needed and a base such as pyridine, 4-dimethylaminopyridine (DMAP) or triethylamine (TEA) is typically added to react with an HCl produced. When pyridine or DMAP is used, it is believed that these amines also act as a catalyst by forming a more reactive acylating intermediate. See, e.g., Fersh et al., J. Am. Chem. Soc., vol. 92, pp. 5432-5442, 1970; and Hofle et al., Angew. Chem. Int. Ed. Engl., vol. 17, p. 569, 1978. Additionally or alternatively, the carboxylic acid could be converted into an acyl anhydride and/or such species could be employed directly.

Regardless of the source of the mono-unsaturated fatty acid, in some embodiments, the carboxylic acids (or their acyl derivatives) used in the above-described methods are derived from biomass. In some such embodiments, this involves the extraction of some oil (e.g., triglyceride) component from the biomass and hydrolysis of the triglycerides of which the oil component is comprised so as to form free carboxylic acids.

Figure 2A:
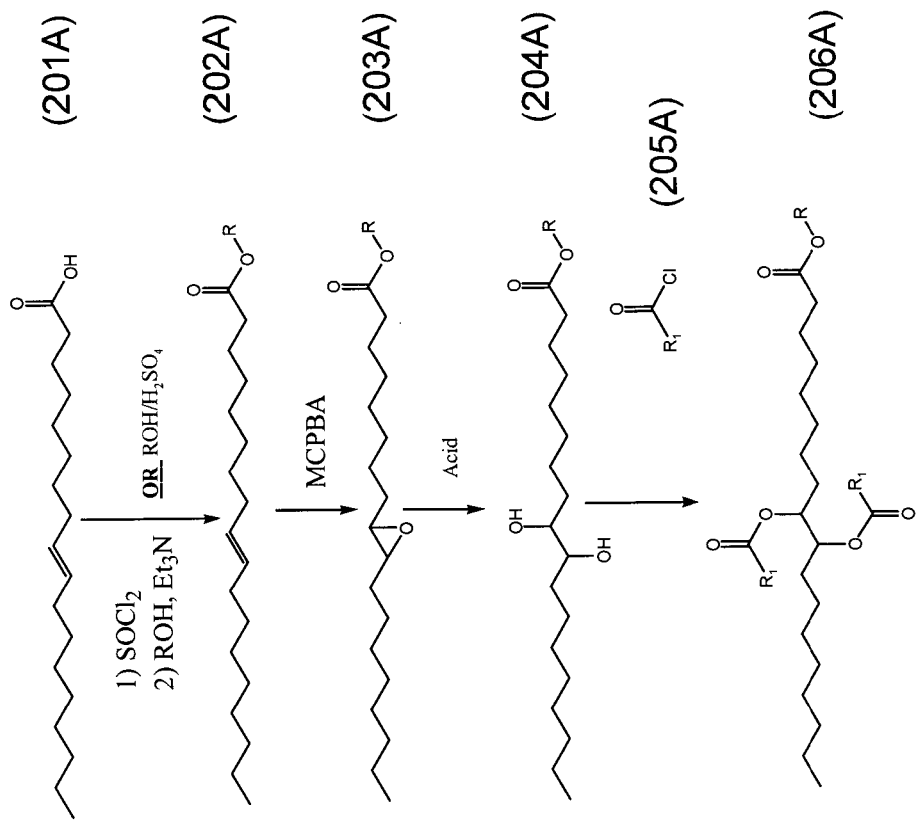
FIG. 2A (Scheme 2) is a chemical flow diagram illustrating an exemplary method of making a diester-based lubricant composition, in accordance with some embodiments of the present invention.
Figure 3A:
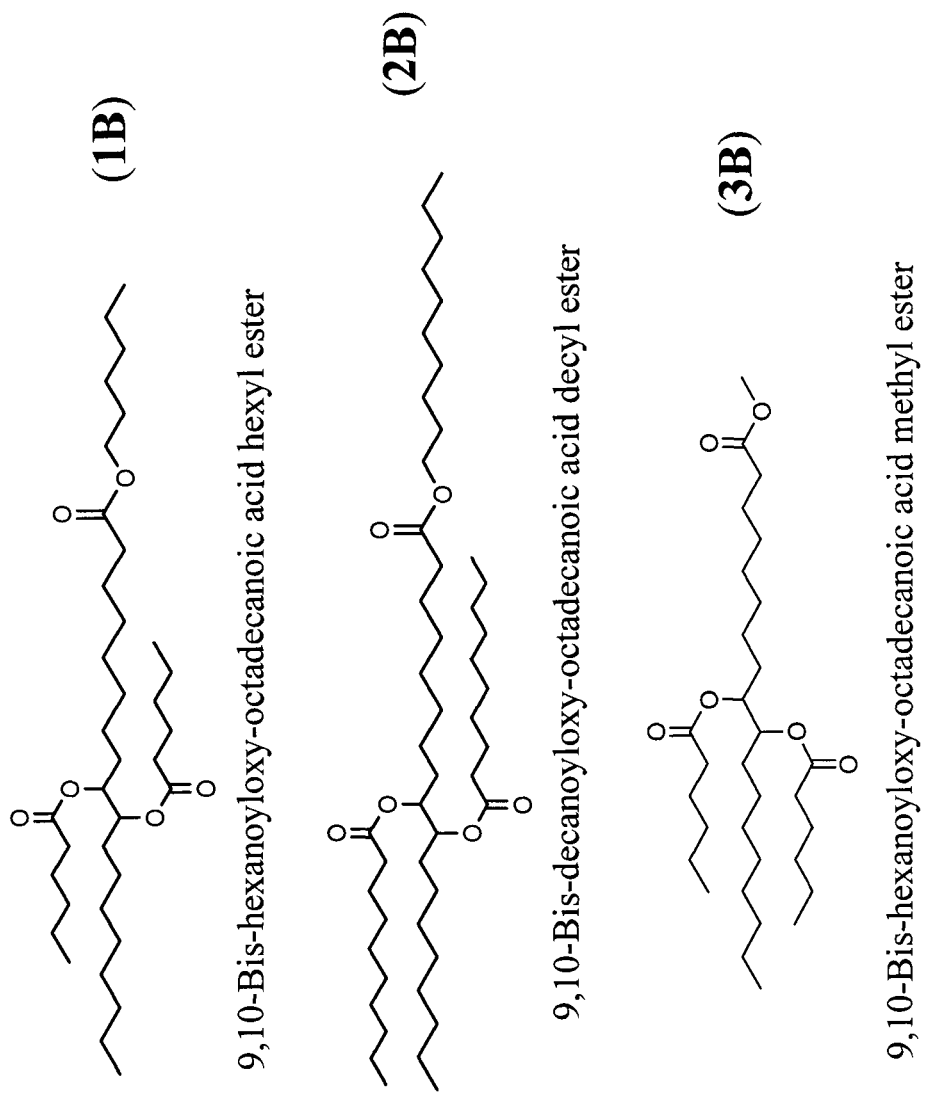
FIG. 3A depicts three exemplary triester-based compounds, 1B. 2B. and 3B, suitable for use as lubricants in accordance with some embodiments of the present invention

Using a synthetic strategy in accordance with that outlined in Scheme 2 (FIG. 2A), oleic acid was converted to triester derivatives 1B (9,10-bis-hexanoyloxy-octadecanoic acid hexyl ester) and 2B (9,10-bis-decanoyloxy-octadecanoic acid decyl ester), shown in FIG. 3A. Referring to FIG. 2A, Scheme 1, oleic acid (201A) is esterified to yield mono-unsaturated ester (202A). Mono-unsaturated ester 202A is subjected to an epoxidation agent to give epoxy-ester species 203A. The epoxy-ester species 203A undergoes ring-opening to yield dihydroxy ester 204A, which can then be reacted with acyl chloride (205A) to yield triester product 206A.

The strategy of the above-described synthesis utilizes the double bond functionality in oleic acid by converting it to the diol via double bond epoxidation followed by epoxide ring opening. Accordingly, the synthesis begins by converting oleic acid to the appropriate alkyl oleate followed by epoxidation and epoxide ring opening to the corresponding diol derivative (dihydroxy ester). Triesters 1B, 2B and 3B were made using synthetic procedures described more fully in Examples 1-7 (vide infra). Triester 1B was made from oleic acid, hexyl alcohol and hexanoyl chloride. Triester 2B was derived from oleic acid, decyl alcohol and decanoyl chloride. Triester 3B was derived from oleic acid, methyl alcohol and hexanoyl chloride.

Variations

Variations on the above-described methods include, but are not limited to, generating (and utilizing) compositional ranges of triesters by blending and/or by compositional variation in the reagents used during the synthesis of the triester species described herein. Compositions produced by such method variations will, naturally, be variations themselves.

All such variations fall within the scope of the compositions and methods described herein.

B. Refrigerant

The refrigerants which may be employed in refrigerators in which the refrigerator oils of the present invention are suitably used, include halohydrocarbons, such as fluoroalkanes having 1-3 carbon atoms, preferably 1-2 carbon atoms and/or chlorofluoroalkanes having 1-3 carbon atoms, preferably 1-2 carbon atoms. The said halohydrocarbons are exemplified by HFCs (chlorine-free type halocarbons) such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a) and 1,1-difluoroethane (HFC-152a); HCFCs (chlorine-containing type halocarbons) such as monochlorodifluoromethane (HCFC-22), 1-chloro-1,1-difluoroethane (HCFC-142b), dichlorotrifluoroethane (HCFC-123) and monochlorotetrafluoroethane (HCFC-124); and mixtures thereof. Among these halohydrocarbons, the chlorine-free type halocarbons such as HFC-32, HFC-23, HFC-125, HFC-134, HFC-134a and HFC-152a, are preferable in view of the environmental problems. The refrigerant used may suitably be selected from these halocarbons mentioned above depending on the purpose for which the resulting refrigerant is used as well as the properties which are desirable for the resulting refrigerant. The preferable refrigerants are exemplified by HFC-134a; a mixture of HFC-134a (60-80 wt %) and HFC-32 (40-20 wt %); a mixture of HFC-32 (50-70 wt %) and HFC-125 (50-30 wt %); a mixture of HFC-134a (60 wt %), HFC-32 (30 wt %) and HFC-125 (10 wt %); a mixture of HFC-134a (52 wt %), HFC-32 (23 wt %) and HFC-125 (25 wt %); and a mixture of HFC-143a (52 wt %), HFC-125 (44 wt %) and HFC-134a (4 wt %).

When the refrigerator oil composition of the present invention is used in a refrigerator, it is usually present in the form of a fluid composition for the refrigerator, which is a mixture of the refrigerator oil and a chlorine-free type halogenocarbon such as a fluoroalkane and/or an chlorofluoroalkane as mentioned above.

The mixing ratio of the refrigerator oil and the refrigerant in the resulting composition is not particularly limited, but the refrigerator oil is usually comprised in an amount of 1-500 parts by weight, preferably in an amount of 2-400 parts by weight, based on 100 parts by weight of the refrigerant.

The refrigerator oils of the present invention are very excellent in compatibility with the halohydrocarbons as compared with the heretofore known refrigerator oils. Further, the refrigerator oils of the present invention are excellent because they have not only high compatibility with the halohydrocarbons, but also high lubricity, low hygroscopicity and high thermal and chemical stability.

Preferably, the refrigerator oils of the present invention may particularly preferably be used in refrigerators, air-conditioners, dehumidifiers, cold-storage chests, freezers, freeze and refrigeration warehouses, automatic vending machines, showcases, cooling units in chemical plants, and the like which have a reciprocating or rotary compressor. The refrigerator oils of the present invention may also be employed in vehicular air conditioning systems. Further, the above refrigerator oils may also preferably be used in refrigerators having a centrifugal compressor.

C. Other Additives

To further enhance the refrigerator oil of this invention in performances, the refrigerator oil may be incorporated, as required, with other known additives for a refrigerator oil, which include phenol antioxidants such as di-tert-butyl-p-cresol and bisphenol A; amine antioxidants such as phenyl-alpha-naphthylamine and N,N-di(2-naphthyl)-p-phenylene-diamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the refrigerator oil. The various additives which may be incorporated in the base oil are collectively referred to as "an additive group" for brevity.

Other embodiments will be obvious to those skilled in the art.

D. Examples

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

As an exemplary synthetic procedure, the synthesis of a diester derived from 7-tetradecene and decanoyl chloride is described in Examples 1-2. This procedure is representative for making diesters from internal olefins and carboxylic acid chlorides (acyl chlorides), in accordance with some embodiments of the present invention.

Example 1

This Example serves to illustrate synthesis of a diol en route to synthesis of a diester species, in accordance with some embodiments of the present invention.

In a 3-neck 1 mL reaction flask equipped with an overhead stirrer and an ice bath, 75 mL of 30% hydrogen peroxide were added to 300 mL of 96% formic acid. To this mixture, 100 g (0.51 mole) of 7-tetradecene (purchased from Aldrich Chemical Co.) was added slowly over a 30 minute period via a dropping funnel. Once the addition of the olefin was complete, the reaction was allowed to stir while cooling with the ice-bath to prevent rise in the temperature above 40-50° C. for 2 hrs. The ice-bath was then removed and the reaction was stirred at room temperature overnight. The reaction mixture was concentrated with a rotary evaporator in a hot water bath at ~30 torr to remove most of the water and formic acid. Then, 100 mL of ice-cold 1 M solution of sodium hydroxide was added very slowly (in small portions) and carefully to the remaining residue of the reaction. Once all the sodium hydroxide solution was added, the mixture was allowed to stir for an additional 45-60 minutes at room temperature. The mixture was diluted with 500 mL ethyl acetate and transferred to a separatory funnel. The organic layer was sequestered and the aqueous layer was extracted 3 times (3×200 mL) with ethyl acetate. The ethyl acetate extracts were combined and dried over anhydrous $MgSO_4$. Filtration, followed by concentration on a rotary evaporator at reduced pressure in a hot water bath gave the desired diol as white powder in 88% yield (95 g). The diol (tetradecane-7,8-diol) was characterized by nuclear magnetic resonance (NMR) spectroscopy and gas-chromatography/mass spectrometry (GC/MS).

Example 2

This Example serves to illustrate synthesis of diester 2 (decanoic acid 2-decanoyloxy-1-hexyl-octyl ester) from tetradecane-7,8-diol.

In a 3-neck 1 L reaction flask equipped with an overhead stirrer, reflux condenser and a dropping funnel, 50 g (0.23 mol) of tetradecane-7,8-diol, as prepared according to Example 1, and 60 g (0.59 mol) triethylamine and a catalytic amount of dimethylaminopyridine (6.5 gm; 0.052 mol)) were mixed in 500 mL anhydrous hexane. The solution was cooled down with an ice bath. To this solution 97 g (0.51 mol) decanoyl chloride was added drop-wise over a 15 minute period. Once the addition was complete, the ice bath was removed and the reaction was allowed to stir overnight. Then, an additional 12 g of the decanoyl chloride was added and the reaction was refluxed overnight. The resulting "milky" reaction solution was neutralized with water. The resulting two layer mixture was then transferred to a separatory funnel. The organic (top) layer was separated and washed with 2×500 mL water. The aqueous layer was extracted with 3×300 mL ether. The ether extracts and the original organic layer were combined, dried over $MgSO_4$, filtered, and concentrated over a rotary evaporator at reduced pressure. The resulting residue was analyzed by NMR and infrared (IR) spectroscopies and GC/MS. Such analysis confirmed the presence of decanoic acid. The mixture was treated with 3 M aqueous solution of sodium carbonate (to neutralize the acid impurity) in 500 mL hexane. The hexane layer was dried over $MgSO_4$, filtered and concentrated on a rotary evaporator to give the desired diester product as a colorless viscous oil with a sweet odor in 81% yield (100.5 g). GC/MS indicated the presence of less than 1% residual acid in the product.

Example 3

Using the procedure described above for making diester 2, diester 1 was prepared from 7-tetradecene and hexanoyl chloride. Diester 1 was obtained as colorless oil with a pleasant odor in 74% overall yield (starting form the 7-tetradecene).

Comparative Example 4

This Example serves to illustrate the effect a high level of symmetry may have on the lubricant properties of the final diester product.

Figure 4:
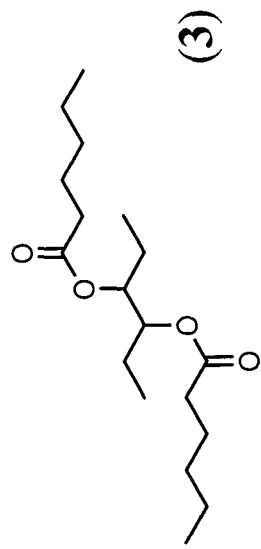
FIG. 4 depicts two diester compounds, 3 and 4, made in accordance with some embodiments of the present invention.
Figure 4:
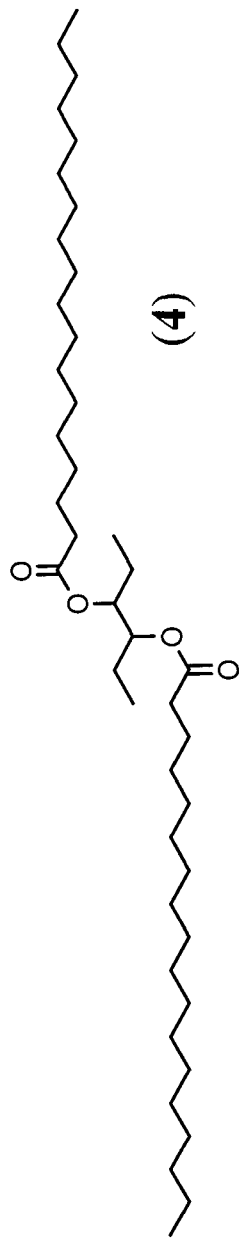

Two diester derivatives of 3-hexene (3 and 4, depicted in FIG. 4) were not oils—they both were solid (waxy) materials. This may have to do with the very high symmetry of these molecules leading to better "packability" of the molecules and resulting in solid products. Diesters 1 and 2 are also symmetrical, but the longer backbone of 7-tetradecene may "twist" and "wiggle" enough to prevent them from having the ability to pack well and form solids. In contrast to diesters 3 and 4, diester species used in accordance with the present invention tend to be selected so as to avoid such enhanced packability.

Example 5

This Example serves to illustrate the lubrication properties of some exemplary bioesters suitable for use as lubricants, in accordance with some embodiments of the present invention.

Figure 5:
FIG. 5 (Table 1) compares lubrication properties of diesters-based lubricants 1 and 2 and their mixture.
Figure 5:
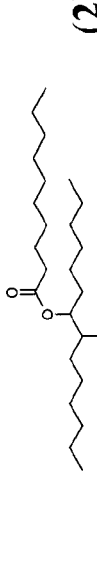
Figure 5:
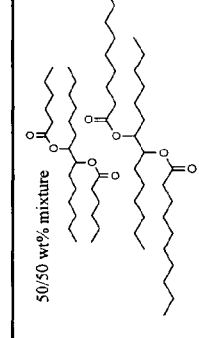

Esters 1 and 2 were prepared as described above and were tested and analyzed for several physical and lubricant properties including viscosity, viscosity index, cloud point, pour point and oxidation stability (see, e.g., ASTM Standard Test Method D 4636). These esters showed very promising lubricant properties. Table 1 (FIG. 5) summarizes the results of some of these tests and analyses. It should be noted that the cloud point for Ester 2 is not as favorable as the cloud point for Ester 1. It is believed that the value of the Ester 2 cloud point may be attributable to the fact that, in pure form, the Ester 2 molecule may form crystals at around 7° C., however those crystals are self-limiting in size. That is, the crystals may not grow and crosslink to the point where they inhibit flow until −39° C. Accordingly, the refrigerator oil composition containing solely Ester 2 may appear to have some level of "cloudiness", however, the appearance of cloudiness will not disrupt the flow of the refrigerator oil. However, in order to overcome this perceived problem, Ester 2 may be mixed with another ester (i.e., Ester 1), thereby ensuring that the cloud point does not inhibit the flow of the refrigerator oil composition.

Table 1 (FIG. 6) discloses properties of some commercial refrigeration oils. It may be noted that the properties of the refrigerator oil esters of the present invention are similar, if not better, than the properties of the commercial refrigerator oils.

What is claimed is:

1. A refrigerator oil composition comprising
   (a) at least one diester species having the following structure:

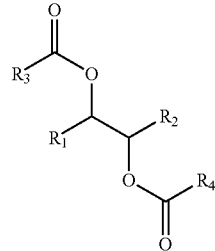

wherein $R_1$ and $R_2$ are independently selected from $C_5$ to $C_{17}$ hydrocarbon groups; and
   $R_3$ and $R_4$ are independently selected from $C_2$ to $C_{17}$ hydrocarbon groups; and
   (b) a refrigerant.

2. The refrigerator oil composition of claim 1 wherein the diester species is derived from a process comprising:
   (a) epoxidizing an olefin having from about 12 to about 16 carbon atoms to form an epoxide comprising an epoxide ring;
   (b) opening the epoxide ring of step (a) and forming a diol;
   (c) esterifying the diol of step (b) with an esterifying species to form a diester species, wherein the esterifying species is selected from the group consisting of carboxylic acids, acyl halides, acyl anhydrides, and combinations thereof, wherein the esterifying species has a carbon number of from 2 to 18, and wherein the diester species has a viscosity and a pour point suitable for use as a refrigerator oil.

3. The refrigerator oil composition of claim 2 wherein the esterifying species is a carboxylic acid.

4. The refrigerator oil composition of claim 3 wherein the carboxylic acid is derived from a bio-derived fatty acid.

5. The refrigerator oil composition of claim 3 wherein the carboxylic acid is derived from alcohols generated by a Fischer-Tropsch process.

6. The refrigerator oil composition of claim 1 wherein the pour point is less than −30° C.

7. The refrigerator oil composition of claim 1 wherein the cloud point is less than 10° C.

8. The refrigerator oil composition of claim 1 wherein the refrigerant is a halohydrocarbon.

9. The refrigerator oil composition of claim 8 wherein the halohydrocarbon comprises a chlorine-free type halogenocarbon, a chlorine-containing type halogenocarbon, or mixtures thereof.

10. The refrigerator oil composition of claim 9 wherein the chlorine-free type halogenocarbon comprises difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), monochlorodifluoromethane (HCFC-22), 1-chloro-1,1-difluoroethane (HCFC-142b), dichlorotrifluoroethane (HCFC-123) and monochlorotetrafluoroethane (HCFC-124); and mixtures thereof.

* * * * *